United States Patent [19]
Kasama et al.

[11] Patent Number: 5,577,826
[45] Date of Patent: Nov. 26, 1996

[54] REFLECTING TYPE COLOR IMAGE PROJECTING APPARATUS

[75] Inventors: Nobuyuki Kasama; Tadao Iwaki; Yasuyuki Mitsuoka; Yukiya Funanami, all of Chiba, Japan

[73] Assignee: Seiko Instruments Inc., Japan

[21] Appl. No.: 548,456

[22] Filed: Oct. 26, 1995

[30] Foreign Application Priority Data

Oct. 28, 1994 [JP] Japan .................................. 6-265818

[51] Int. Cl.$^6$ .................................................. G03B 21/28
[52] U.S. Cl. .............................. 353/31; 353/34; 359/48; 359/72
[58] Field of Search ......................... 353/20, 8, 31, 353/33, 34, 37, 84; 359/48, 49, 72

[56] References Cited

U.S. PATENT DOCUMENTS

| | | | |
|---|---|---|---|
| 4,127,322 | 11/1978 | Jacobson et al. | 359/72 |
| 4,826,311 | 5/1989 | Ledebohr | 353/31 |
| 5,124,545 | 6/1992 | Takanashi et al. | 359/72 |
| 5,130,826 | 7/1992 | Takanashi et al. | 359/72 |
| 5,260,815 | 11/1993 | Takizawa | 359/72 |
| 5,321,448 | 6/1994 | Ogawa | 353/37 |
| 5,374,968 | 12/1994 | Haven et al. | 353/31 |
| 5,379,135 | 1/1995 | Nakagaki et al. | 359/72 |
| 5,389,982 | 2/1995 | Lee | 353/20 |

*Primary Examiner*—William Dowling
*Attorney, Agent, or Firm*—Adams & Wilks

[57] ABSTRACT

To effectively utilize a luminous flux from a light source thereby realizing a reflecting type color image projecting apparatus having a high brightness. The apparatus includes three sheets of reflecting type optical writing liquid crystal light valves, means for writing images of respective color components to the respective reflecting type optical writing liquid crystal light valves, a polarized beam splitter for splitting a light source luminous flux into polarized light illuminating luminous fluxes, means for separating only a green component of one of the polarized light illuminating luminous fluxes, means for separating the other one of the polarized light illuminating luminous fluxes into a red component and a blue component and a projecting lens. A back focus from the projecting lens to the reflecting type optical writing liquid crystal light valves can be shortened and utilization efficiency of a luminous flux from a light emitting source can more be enhanced than a conventional reflecting type color image projecting apparatus.

3 Claims, 8 Drawing Sheets

FIG. 1

FIG. 2A
WAVELENGTH CHARACTERISTICS OF B REFLECTION MIRROR

FIG. 2B
WAVELENGTH CHARACTERISTICS OF GCF

FIG. 2C
WAVELENGTH CHARACTERISTICS OF GBF

FIG. 2D
INTENSITY DISTRIBUTION OF EACH COLOR ON SCREEN

FIG. 5A PRIOR ART
WAVELENGTH CHARACTERISTICS OF B-DM

FIG. 5B PRIOR ART
WAVELENGTH CHARACTERISTICS OF R-DM

FIG. 5C PRIOR ART
INTENSITY DISTRIBUTION ON SCREEN

FIG.6

FIG. 7A
WAVELENGTH CHARACTERISTICS OF REFLECTANCE OF B REFLECTION MIRROR

FIG. 7B
WAVELENGTH CHARACTERISTICS OF TRANSMITTANCE OF B REFLECTION MIRROR

FIG. 7C
INTENSITY DISTRIBUTION OF EACH COLOR ON SCREEN

REFLECTING TYPE COLOR IMAGE PROJECTING APPARATUS

BACKGROUND OF THE INVENTION

The present invention relates to a color image reflecting apparatus of a projecting type.

The basic structure of a conventional reflecting type liquid crystal image projecting apparatus is composed of a plurality of reflecting type optical writing liquid crystal light valves, writing means each for optically writing an image of each color component to each of the reflecting type light writing liquid crystal light valves by illuminating a writing light from one face side thereof, a polarized light illuminating optical system for illuminating polarized light illuminating luminous fluxes corresponding to the respective color components on reading faces of the respective reflecting type optical writing liquid crystal light valves and reflectively reading images of the respective color components written in the reflecting type optical writing liquid crystal light valves and a projecting optical system for synthesizing, magnifying and projecting the read images of the respective color components thereby projecting a color image.

First, an explanation will be given of structure of the reflecting type optical writing liquid crystal light valve that is used in the reflecting type liquid crystal image projecting apparatus.

Figure 3:
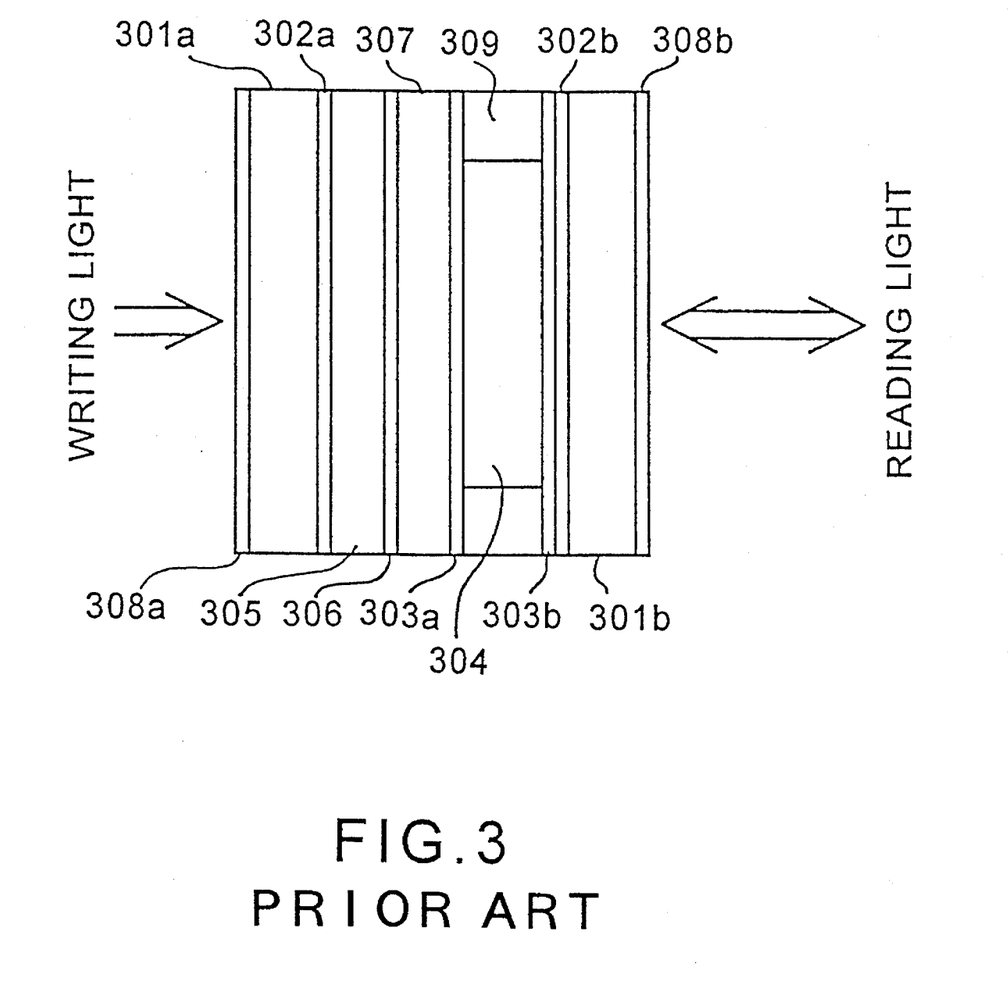
FIG. 3 is a sectional view showing a structure of a reflecting type optical writing liquid crystal light valve.

FIG. 3 is a sectional view showing the structure of the reflecting type optical writing liquid crystal light valve. Transference electrode layers 302a and 302b and orientation film layers 303a and 303b are provided on the surfaces of transparent substrates 301a and 301b such as glass or plastics for sandwiching liquid crystal molecules. The transparent substrates 301a and 301b on their respective sides of the orientation film layers 303a and 303b are opposed while controlling the clearance by interposing spacers 309 thereby sandwiching a liquid crystal layer 304. Further, a photoconductive layer 305, a light shielding layer 306 and a dielectric mirror 307 are laminated between the transference electrode layer 302a on the side of writing by light and the orientation film layer 303a and reflectionless coating layers 308a and 308b are formed on outer faces of cells of the transparent substrate 301a on the side of writing and the transparent substrate 301b on the side of reading. As liquid crystals of the liquid crystal layer 304, nematic liquid crystals or ferroelectric liquid crystals etc. are used. Especially, a reflecting type liquid crystal light valve using ferroelectric liquid crystals is provided with a very fast operational speed of several hundreds Hz or more. Although it is known that the reflecting type light writing liquid crystal light valve using the ferroelectric liquid crystals is a device for thresholding and making binary an input image, it is also possible to perform a gray scale display by devising the waveform of a drive voltage.

In reading an image written in such a reflecting type optical writing liquid crystal light valve, firstly, a polarized light component of a luminous flux is limited to a linearly polarized light, for example, a s polarized light component formed by a polarizing plate etc. that is irradiated on the reflecting type optical writing liquid crystal light valve. Thereafter, only a linearly polarized light of a luminous flux reflected by the reflecting type optical writing liquid crystal light valve that is orthogonal to the polarization axis of the linearly polarized light of the incident luminous flux, for example, (a p polarized light component), is transmitted through a polarizing plate etc. by which the written image can be read as intensity information. The image read in such a way becomes a positive image.

Next, a specific explanation will be given of the structure of the reflecting type liquid crystal image projecting apparatus in reference to FIG. 4. This reflecting type liquid crystal image projecting apparatus is composed of three sheets of reflecting type optical writing liquid crystal light valves. That is, the apparatus includes a reflecting type optical writing liquid crystal light valve (hereinafter, R-SLM) 113 allocated with a red image among those having three elementary colors of red, green and blue, a reflecting optical writing liquid crystal light valve (hereinafter, G-SLM) 105 allocated with a green image and a reflecting type optical writing liquid crystal light valve (hereinafter, B-SLM) 110 allocated with a blue image.

This reflecting type liquid crystal image projecting apparatus includes TFT liquid crystal panels and writing lenses as writing means of the respective images of the respective color components and a red component image displayed by the R-TFT 115 is optically written on a writing face of the R-SLM 113 by the R-writing lens 114. Similarly, a green component image displayed by the G-TFT 107 is optically written on a writing face of the G-SLM 105 by the G-writing lens 106. Further, a blue component image displayed by the B-TFT 112 is optically written on a writing face of the B-SLM 110 by the B-writing lens 111.

Meanwhile, the apparatus includes as a polarized light illuminating optical system a light source 101, an illuminating lens system 102, a polarized beam splitter (hereinafter, PBS) 103, a red reflecting dichroic mirror (hereinafter, R-DM) 402 and a blue reflecting dichroic mirror (hereinafter, B-DM) 401. A luminous flux emitted from the light source 101 becomes an illuminating luminous flux irradiated on the reflecting type optical writing liquid crystal light valves by the illuminating lens system 102. The illuminating light flux is split into mutually orthogonal polarized illuminating fluxes by the PBS 103. When one polarized illuminating flux reflected by the PBS 103 is, for example, a s polarized light, the other polarized illuminating luminous flux transmitted through the PBS 103 becomes a p polarized light. Only a red component included in the s polarized light component is selectively reflected by the R-DM 402 which is irradiated on the R-SLM 113 and reflectively reads a red component image. The remaining color component transmitted through the R-DM 113 is separated into a green component and a blue component by the B-DM 401. A green component transmitted through the B-DM 401 is irradiated on the G-SLM 105 and reflectively reads a green component image.

Meanwhile, the blue component reflected by the B-DM 401 is irradiated on the B-SLM 110 and reflectively reads a blue component image. The three kinds of the red component image, the green component image and the blue component image which have been read in this way, are again synthesized by the B-DM 401 and the R-DM 402, the synthesized transmits through the PBS 103 and is magnified and projected on a screen 117 in front via a projecting lens 116. As a result, a color image is projected on the surface of the screen 117.

However, there are following problems in the reflecting type color image projecting apparatus.

In the conventional reflecting type color image projecting apparatus, the light source luminous flux is separated into a s polarized light and a polarized light component by using the PSB 103 and only the s polarized light (or p polarized light) component is taken out as a polarized light illuminating luminous flux. The other p polarized light (or s polarized light) component is not used at all as an illuminating luminous flux. Accordingly, in the conventional structure the utilization efficiency of the light source luminous flux cannot exceeds 50% and the brightness of the projected color image is low.

In addition thereto, in case where a luminous flux is not incident on a color separating mirror such as the B-DM 401 or the R-DM 402 in an orthogonal direction, there causes a deviation in the reflectance characteristic with respect to a wavelength depending on the polarized light component.

Figure 5A:
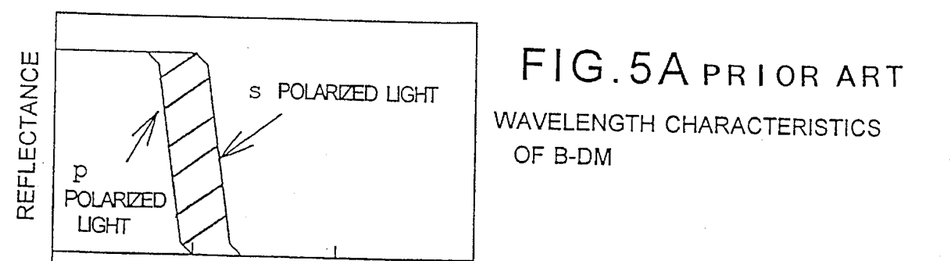
FIGS. 5A–C illustrate views explaining waveform characteristics of respective color components in the conventional example.
Figure 5B:
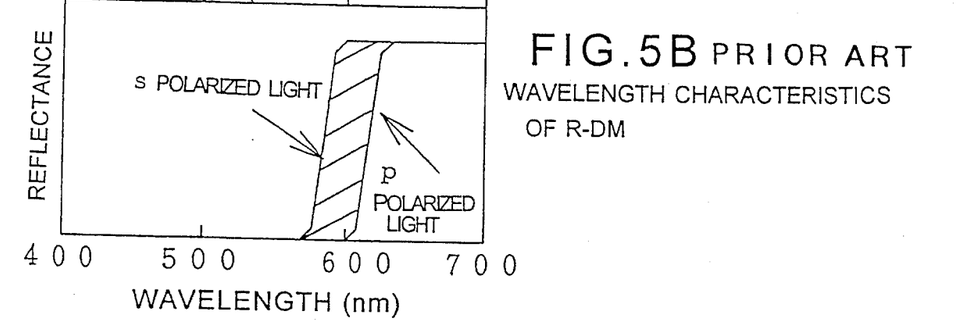

FIG. 5(a) and FIG. 5(b) are views showing the reflectance characteristics of the B-DM 401 and the R-DM 402 with respect to the s polarized light component and the p polarized light component. These drawings illustrate the characteristics in case where the luminous flux is incident on the B-DM 401 and the R-DM 402 by an angle of 45°. It is very difficult and almost impossible to make the reflectance characteristics with respect to the s polarized light component and the p polarized light component agree with each other.

Figure 4:
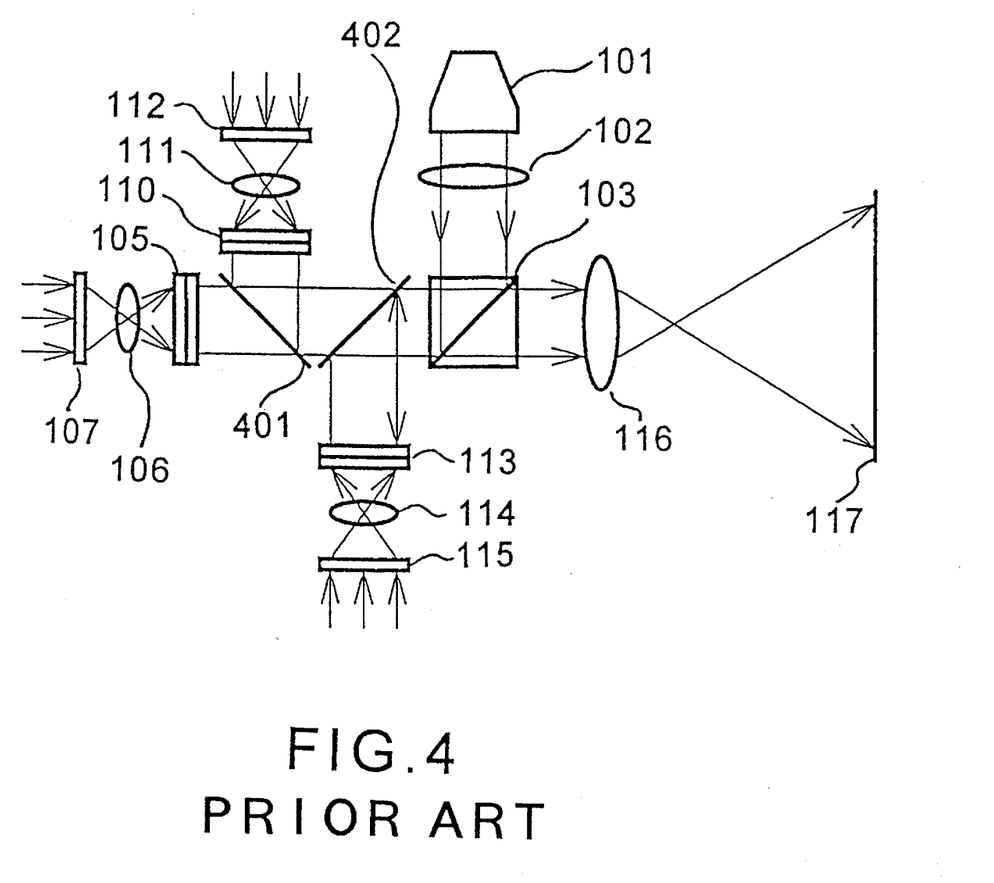
FIG. 4 is a structural view showing a conventional. reflecting type color image projecting apparatus.

In the conventional reflection type color image projecting apparatus shown in FIG. 4 the R-DM 402 is provided with the characteristic shown in FIG. 5(b) therefore, the polarized light illuminating luminous flux having the s polarized light component that is reflected by the PBS 103 for illuminating the R-SLM 113 is provided with the wavelength characteristic of the s polarized light shown in FIG. 5(b). The luminous flux that is modulated and reflected by the R-SLM 113 therefore, is reflected by the R-DM 402 and transmits through the PBS 103 thereby enabling to read the image of the red component.

However, the red image of the red color component is composed of only the p polarized light component. That is, the luminous flux in compliance with the wavelength characteristic of the p polarized light is obtained by the R-DM 402. A difference of characteristics between the s polarized light and the p polarized light shown by a hatched portion of FIG. 5(b) is not utilized and becomes a total loss. Similarly, the same is applicable to the blue component reflected by the B-DM 401 and a difference between characteristics of the s polarized light and the p polarized light shown by a hatched portion of FIG. 5(a) becomes a total loss. With regard to the green component, only the s polarized light component which has not been reflected in FIG. 5 (a) and FIG. 5(b) is illuminated on the G-SLM 105. All of the wavelength band of the p polarized light component of the luminous flux which has been modulated by the G-SLM 105 can transmit through the PBS 103.

Figure 5C:
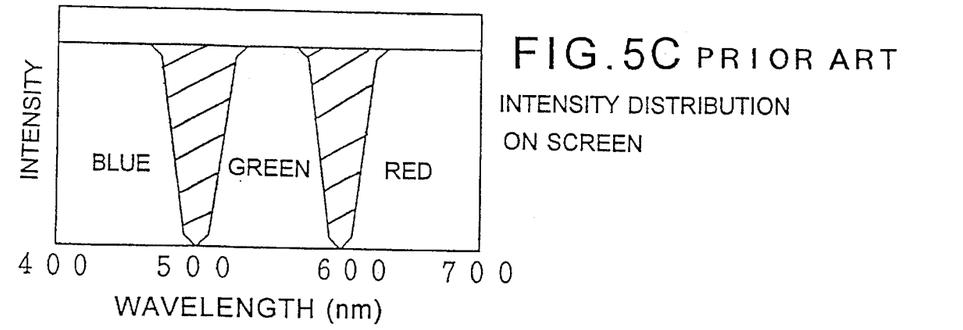

The reason is that all of the band of the s polarized light component transmitting through both the B-DM 401 and the R-DM 402 is included in the band of the p polarized light component. Therefore, a total white image projected by the conventional reflecting type color image projecting apparatus wherein the B-DM 401 and the R-DM 402 are used in a 45° direction is provided with the wavelength characteristic as shown in FIG. 5(c). The light at the hatched portions in FIG. 5(c) becomes a loss. It is not possible in the conventional reflecting type color image projecting apparatus to use all of the polarized light illuminating luminous flux having only the s polarized light component. That is, an amount of light becomes a loss by a difference between the reflectance characteristics of the color separating mirrors with regard to the s polarized light component and the p polarized light component.

Further, in the conventional structure at least two sheets of the color separating mirrors (that is the B-DM 401 and the R-DM 402) are necessary between the PBS 103 and the G-SLM 105 or the B-SLM 110. That is, the back focus of the projecting lens must be set long since the optical lengths from the projecting lens 116 to the G-SLM 105 and the B-SLM 110 become long. Accordingly, the F number of the projecting lens becomes large. Meanwhile, a bright and highly-magnified projecting lens is necessary to magnify and project a color image having a high brightness. Accordingly, it is extremely difficult to design and manufacture a projecting lens which satisfies the mutually conflicting required characteristics.

SUMMARY OF THE INVENTION

To solve the above problems, the present invention provides a reflecting type color image projecting apparatus including three sheets of reflecting type optical writing liquid crystal light valves, writing means each for writing an image of each color component allocated to each reflection type optical writing liquid crystal light valve by illuminating a writing light from a writing face of each reflecting type optical writing liquid crystal light valve, a light emitting source and an illuminating lens for illuminating a light source luminous flux, a polarized beam splitter for splitting the light source luminous flux into polarized light illuminating fluxes, a green color separating means for separating only a green component of one of the polarized light illuminating luminous fluxes, a red and blue color separating means for separating other one of the polarized light illuminating luminous fluxes into a red component and a blue component and a projecting lens for magnifying and projecting a read color image.

DETAILED DESCRIPTION OF THE INVENTION

The images corresponding to the respective color components are written to the three sheets of the reflecting type optical writing liquid crystal light valves by TFT panels or the like. The polarized light illuminating fluxes are produced by splitting the light source luminous flux emitted from the light emitting source by the polarized beam splitter. Thereafter, with regard to the one of the polarized light illuminating luminous fluxes (for example, the s polarized light component), only the green component thereof is illuminated on the green reflecting type optical reading liquid crystal light valve as a reading light by the green color separating means such as a band pass filter etc. transmitting only the green component. With regard to the other one of the polarized light illuminating fluxes (for example, the P polarized light component), the green component is cut by the red and the blue color separating means which separates the red component and the blue component and only the red and the blue components are respectively illuminated on the red and the blue reflection type optical writing liquid crystal light valves as reading lights. Further, the images of the respective color components written in the respective reflecting type optical writing liquid crystal light valves are read and an image having the red, green and blue components is synthesized by the red and the blue color separating means and the polarized beam splitter. Thereafter, the synthesized color image is magnified and projected on the screen by the projecting lens.

Therefore, the back focus from the projecting lens to the reflecting type optical writing liquid crystal light valves can be shortened and further, the utilization efficiency of the luminous flux of the light emitting source can more be enhanced than that of the conventional reflection type color image projecting apparatus.

EMBODIMENTS

An explanation will be given of embodiments of the present invention as follows.

(1) First Embodiment

Figure 1:
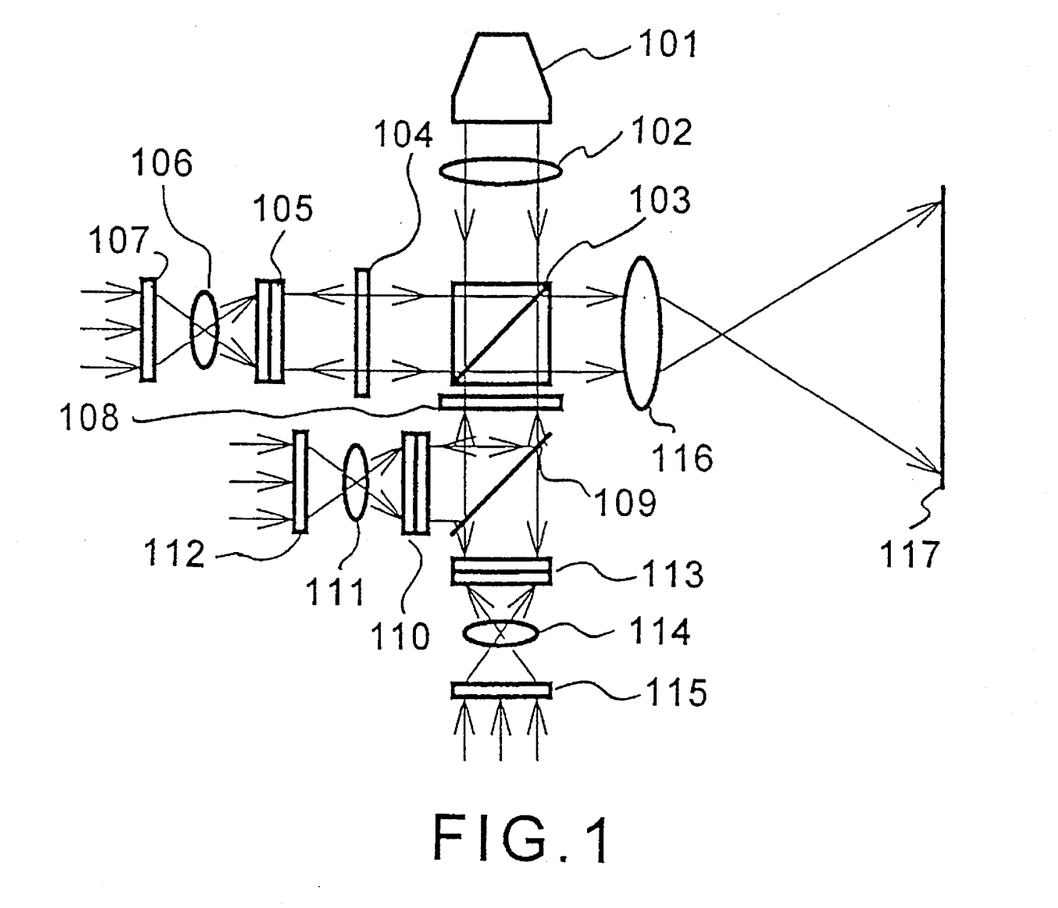
FIG. 1 is a structural view showing a first embodiment of a reflecting type color image projecting apparatus according to the present invention.

FIG. 1 is a structural view of a first embodiment of a reflecting type color image projecting apparatus of the present invention.

The first embodiment of the present invention is a polarized light separating and synthesizing optical system which is constituted by a PBS 103, a green band pass filter (hereinafter, GBF) 104 transmitting only a green component of a polarized light illuminating luminous flux of a s polarized light component reflected by the PBS 103, a green cut filter (hereinafter, GCF) 108 separating red and blue components by cutting a green component from a polarized light illuminating luminous flux of a p polarized light component which has transmitted through the PBS 103 and a blue reflecting mirror 109.

Writing means each is constituted by a TFT panel and a writing lens for each color component. The writing means with respect to the green component is constituted by a G-TFT 107 displaying an image of the green component and a G-writing lens 106 for writing the displayed image to a G-SLM 105. The image of the green component displayed on the G-TFT 107 is read by illuminating a reading light from behind the G-TFT 107. The read image is written to the G-SLM 105 by the G-writing lens 106. Quite similarly, the writing means with respect to the blue component is constituted by a B-TFT 112 and a B-writing lens 111. The writing means with respect to the red component is constituted by a R-TFT 115 and a R-writing lens 114. Here, although the TFT panels are used for the writing means of the images in this embodiment, a device or an optical system capable of displaying two-dimensional images such as a CRT or a laser scanning optical system etc. may naturally be used.

Further, the GBF 104 is used as a green color separating means separating only the green component of the polarized light illuminating luminous flux of the s polarized light component. However, as the green color separating means an optical part etc. capable of separating only the green component such a green reflection mirror etc. may naturally used.

Figure 2A:
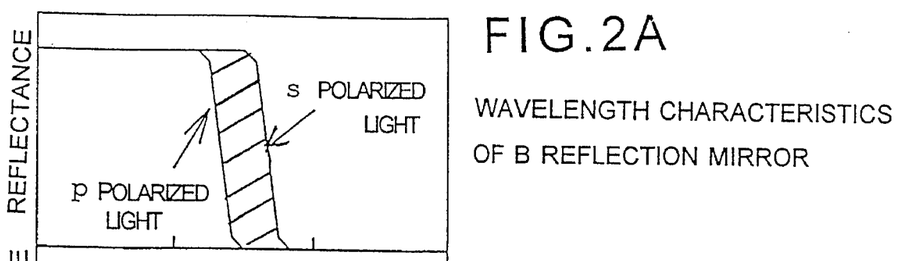
FIGS. 2A–D illustrate views showing waveform characteristics of respective color components according to the present invention.
Figure 2B:
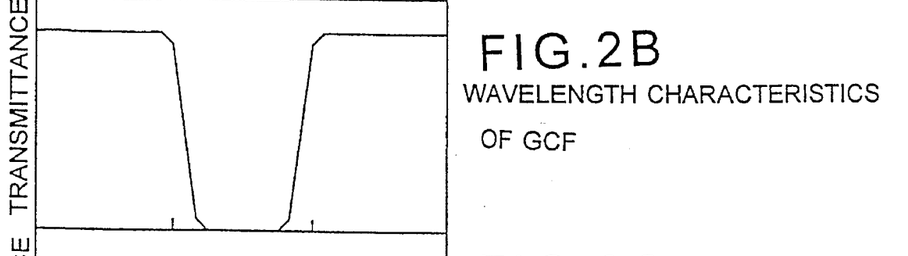
Figure 2C:
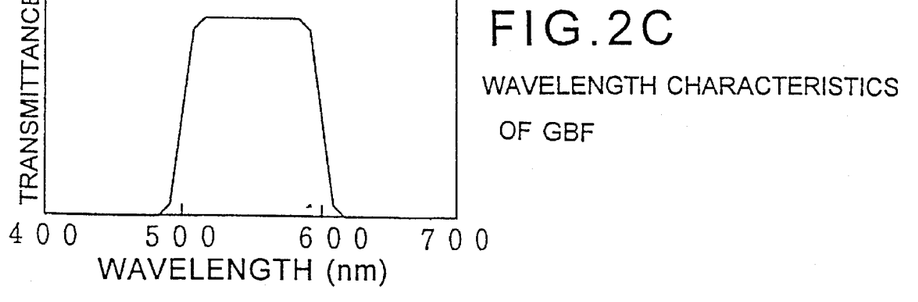
Figure 2D:
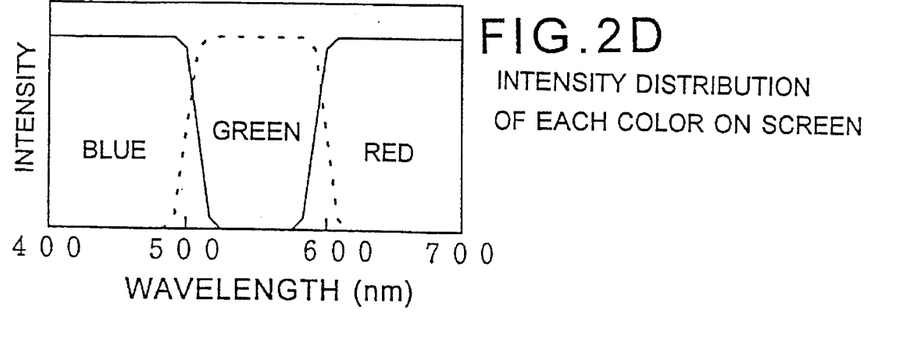

A luminous flux emitted from a light emitting source 101 is illuminated on the PBS 103 as a light source luminous flux by an illuminating lens 102. The light source luminous flux illuminated on the PBS 103 becomes a polarized light illuminating luminous flux which is a luminous flux of only a p polarized light or a s polarized light component by transmitting through or being reflected by the PBS 103. The polarized light illuminating luminous flux of a s polarized light component reflected by the PBS 103, transmits through the GBF 104 having the wavelength characteristic as shown in FIG. 2(c). The polarized light illuminating luminous flux which has transmitted through the GBF 104 is irradiated on the G-SLM 106 as a reading light. Further, the reading light reflected by the G-SLM 105 again transmits through the GBF 104 and transmits through the PBS 103. The wavelength characteristic of the green component of the image which is magnified and projected by a projecting lens 116 is shown in FIG. 2(d) by a dotted line. The polarized light illuminating luminous flux is incident approximately orthogonally on the GBF 104 and therefore, there is no difference between the wavelength characteristics of the transmittances (reflectances) of the s polarized light and the p polarized light.

Further, the green component of the polarized light illuminating luminous flux of the p polarized component which has transmitted through the PBS 103 is cut by transmitting through the GCF 108. The wavelength characteristic of the transmittance of the GCF 108 is shown in FIG. 2(b). The polarized light illuminating luminous flux which has transmitted through the GCF 108 in such a way is separated into the blue component and the red component by the B-reflecting mirror 109. The reflectance characteristic of the B-reflecting mirror 109 is shown in FIG. 2(a). A portion (hatched portion) of the figure showing a difference between the wavelength characteristics of the p polarized light component and the s polarized light component is in a band wherein these components cannot be transmitted through the GCF 108 and therefore, the blue component and the red component are determined by the transmittance characteristic of the GCF 108. The blue component of the polarized light illuminating luminous flux reflected by the B-reflecting mirror 109 is incident on the B-SLM 110 as a reading light. The incident reading light is reflected by the B-SLM 110.

Further, the red component of the polarized light illuminating luminous flux which has transmitted through the B-reflecting mirror 109 is similarly illuminated on the R-SLM 113 as a reading light and is reflected thereby. The reading lights reflected by the B-SLM 110 and the R-SLM 113 are synthesized by the blue reflecting mirror and again transmit through the GCF 108. The red and blue components which have transmitted through the GCF 108 are reflected by the PBS 103 and are synthesized with the image of the green component by the PBS 103. The bands of the blue component and the red component are determined by the band of the GCF 108 and the components are separated in two colors by the B-reflecting mirror 109. The wavelength characteristics of the images of the red component and the blue component are shown by FIG. 2(d) in a bold line. Further, a color image synthesized by the three colors of red, green and blue is magnified and projected on a screen 117 by a projecting lens 116.

The wavelength band of the green component can be determined only by the GBF 104. The utilization efficiency of the light source luminous flux can be enhanced by pertinently utilizing the wavelength band of the green color.

Here, in case where a portion (hatched portion) showing the difference between the wavelength characteristics of the p polarized light component and the s polarized light component of the B-reflecting mirror 109 in FIG. 2(a) is deviated from the reflection band of the GCF 108, the band of the blue component becomes a product of the transmittance characteristic of the GCF 108 by the reflectance characteristics of the p polarized light component of the B-reflecting mirror 109. The band of the red component becomes a product of the transmittance characteristic of the GCF 108 by the transmittance characteristic of the s polarized light component of the B-reflecting mirror 109.

Further, a similar effect as that in this embodiment can naturally be provided by using a red reflecting mirror in place of the B-reflecting mirror 109. However, it is necessary in that case to switch the arrangement of the writing means for writing the red image and the R-SLM 113 by that of the writing means for writing the blue image and the B-SLM 110.

(2) Second Embodinent

Figure 6:
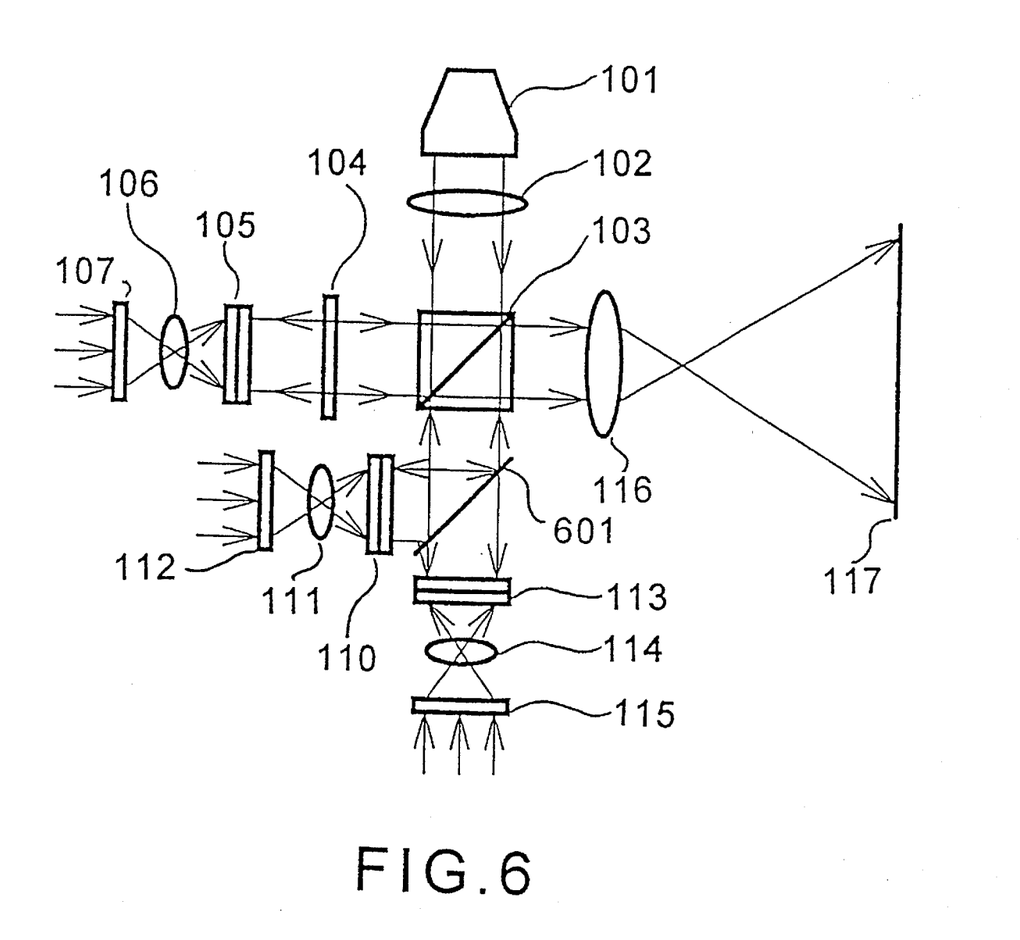
FIG. 6 is a structural view showing a second embodiment of a reflecting type color image projecting apparatus according to the present invention.

FIG. 6 is a structural view of a second embodiment of a reflecting type color image projecting apparatus according to the present invention. This embodiment is an embodiment in which the GCF 108 is omitted in the first embodiment of FIG. 1. Feature is provided to the wavelength characteristic of a B-reflecting mirror 601 as a substitute for the omitted GCF 108. Therefore, the explanation of this embodiment is partially omitted or simplified with respect to the portions the same as the structure of the first embodiment.

In the first embodiment of FIG. 1 the polarized light illuminating luminous flux is separated into the blue component and the red component by the GCF 108 and the B-reflecting mirror 109. As a substitute therefor, in the second embodiment of FIG. 6 the B-reflecting mirror 601 having the wavelength characteristics shown in FIG. 7(a) and FIG. 7(b) is used.

Figure 7A:
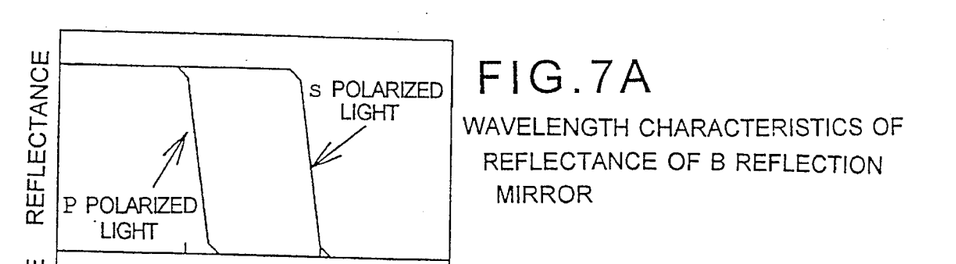
FIGS. 7A–C are structural views showing a third embodiment of a reflecting type color image projecting apparatus according to the present invention.
Figure 7B:
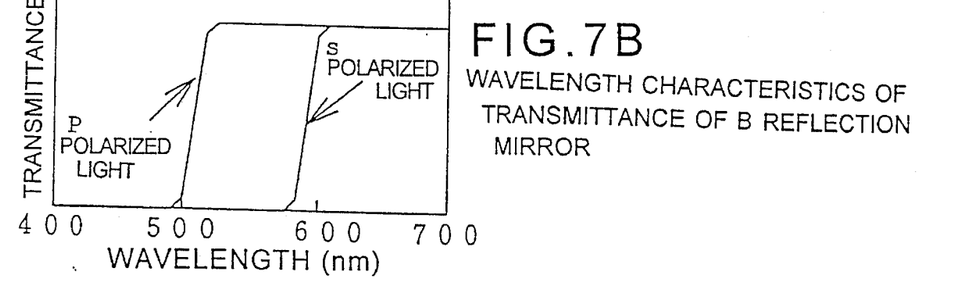

The B-reflecting mirror 601 is used in 45° incidence and therefore, there causes a difference between the wavelength characteristics of the s polarized light component and the p polarized light component of the reflected or transmitted light as shown in FIG. 7(a). The difference between the s polarized light component and the p polarized light component is controlled in manufacturing the B-reflecting mirror 601. The green component of the polarized light illuminating luminous flux of the p polarized light component is cut by using a pertinent difference between the wavelength characteristics of the s polarized light component and the p polarized light component.

Figure 7C:
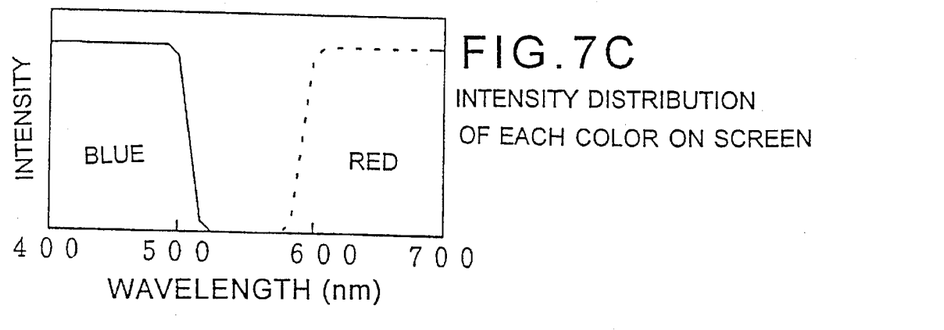

The polarized light illuminating luminous flux having only the p polarized light component which has transmitted through the PBS 103 is reflected by the B-reflecting mirror 601 and is illuminated on the B-SLM 110 as a reading light. Thereafter, the reading light which has been reflected by the B-SLM 110 is modulated in accordance with the written image of the blue component and is again reflected by the B-reflecting mirror 601. Thereafter, only the s polarized light component is reflected by the PBS 103 and is magnified and projected on the screen 117 by the projecting lens 116. The wavelength characteristic of the image of the blue component which has been projected on the screen 117 is shown by FIG. 7(c) in a bold line. That is, the polarized light illuminating luminous flux of the image of the blue component is composed of only the p polarized light component and therefore, it conforms to the wavelength band of the p polarized light component having a shorter wavelength in the reflectance wavelength characteristic of the B-reflecting mirror 601 shown in FIG. 7(a).

Further, the polarized light illuminating luminous flux which has transmitted through the blue reflecting mirror is illuminated on the R-SLM 113 as a reading light. The wavelength band of the reading light illuminated on the R-SLM 113 becomes a wavelength band of the p polarized light component having the transmittance characteristic of the B-reflecting mirror 601 as shown in FIG. 7(b). Thereafter, the reading light reflected by the R-SLM 113 is modulated in correspondence with the written image of the red component and again transmits through the B-reflecting mirror 601. Thereafter, only the s polarized light component is reflected by the PBS 103 and is magnified and projected on the screen 117 by the projecting lens 116. The wavelength characteristic of the image of the red component projected on the screen 117 is shown by FIG. 7(c) in a dotted line. That is, although the polarized light illuminating luminous flux of the image of the red component is composed of only the p polarized light component, since only the s polarized light component luminous flux is reflected by the PBS 103, it conforms to the wavelength band of the s polarized light component having a longer wavelength in the transmittance wavelength characteristic of the B-reflecting mirror 601 as shown in FIG. 7(b).

The other structure is the same as the structure of the first embodiment of FIG. 1, and therefore, the explanation will be omitted.

As mentioned above, the green component of the polarized light illuminating luminous flux having only the p polarized light component which has transmitted through the PBS 103 is cut and the flux is separated into the red and blue components and only the green component of the polarized light illuminating luminous flux of the s polarized light component which has passed through PBS 103 can be taken out. Thereafter, the red, green and blue components are synthesized by the PBS 103 and the B-reflecting mirror 601 and a color image can be magnified and projected on the screen 117 by the projecting lens 116.

(3) Third Embodiment

Figure 8:
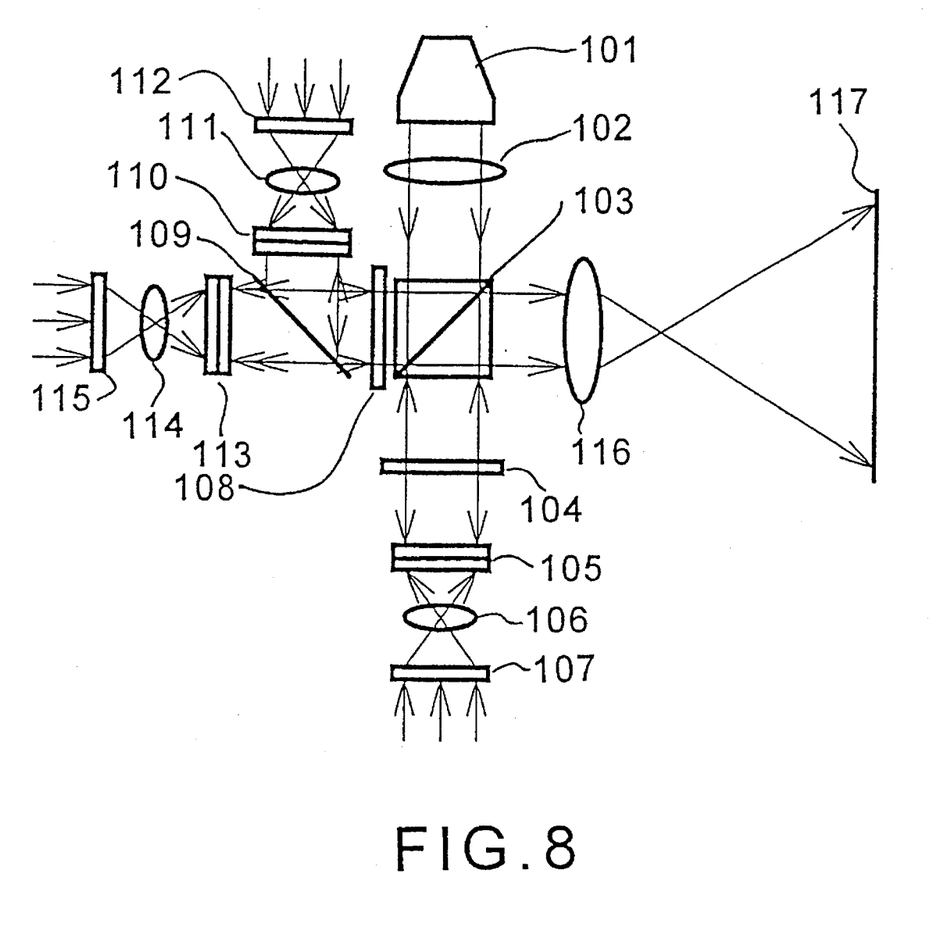
FIG. 8 is a structural view of the second embodiment of the reflecting type color image projecting apparatus according to the present invention.

FIG. 8 is a structural view of a third embodiment of a reflecting type color image projecting apparatus according to the present invention.

This embodiment is an embodiment in which in the first embodiment of FIG. 1 the green component uses the polarized light illuminating luminous flux of the p polarized light component which has transmitted through the PBS 103 and the red and blue components use the polarized light illuminating luminous flux of the s polarized light component which has been reflected by the PBS 103. Accordingly, the explanation of the embodiment is partially omitted or simplified with regard to the portions the same as the structure of the first embodiment.

This embodiment is a polarized light separating and synthesizing optical system constituted by the PBS 103, the GBF 104 transmitting only the green component of the polarized light illuminating luminous flux of the p polarized light component which has transmitted through the PBS 103, the GCF 108 separating the red and the blue components by cutting the green component from the polarized light illuminating luminous flux of the s polarized light component which has been reflected by the PBS 103 and the blue reflecting mirror 109. The respective reflecting type optical writing crystal liquid light valves and the writing means of the respective color components are arranged at the positions corresponding to the respective color components. The other is the same as the structure of the first embodiment of FIG. 1.

Although the polarized light illuminating luminous flux of the p polarized light component of the green component is different from that in the first embodiment of the FIG. 1 with respect to the polarized light component of the green component, it is similarly incident approximately orthogonally on the GBF 104. With regard to the characteristic of the GBF 104, there is no difference between the characteristics of the s polarized light and the p polarized light in case of the orthogonal incidence and therefore, an effect similar to the first embodiment of FIG. 1 can be provided. Further, the green component of the polarized light illuminating luminous flux of the s polarized light component which has been reflected by the PBS 103 is cut by transmitting through the GCF 108. The polarized light illuminating a luminous flux which has transmitted through the GCF 108 is separated into the blue component and the red component by the blue reflecting mirror 109. The reflectance characteristic of the blue reflecting mirror 109 is shown in FIG. 2(*a*). The portion (hatched portion) of the figure showing the difference between the wavelength regions of the p polarized light component and the s polarized light component is in the reflection band of the GCF 108 and therefore, the blue component and the red component are determined by the transmittance characteristic of the GCF 108. That is, an effect quite similar to the first embodiment of the FIG. 1 can be provided.

Accordingly, a color image is magnified and projected on the screen 117 by the projecting lens 116 as in the first embodiment of FIG. 1.

Here, in FIG. 2, when the portion (hatched portion) showing the difference of the wavelength regions of the p polarized light component and the s polarized light component in the blue reflecting mirror 109 is deviated from the inside of the reflection band of the GCF 108, the band of the blue component becomes a product of the transmittance characteristic of the GCF 108 by the reflectance characteristic of the p polarized light component of the blue reflecting mirror 109. The band of the red component becomes a product of the transmittance characteristics of the GCF 108 by the transmittance characteristic of the s polarized light component of the blue reflecting mirror 109. This is the same as the first embodiment of FIG. 1.

Further, an effect similar to this embodiment can naturally be provided by using a red reflecting mirror instead of the the blue reflecting mirror 109. However, it is necessary in that case to switch the arrangement of the writing means for writing the red image and the R-SLM 113 with that of the writing means for writing the blue image and the B-SLM 110.

Further, also in this embodiment the GCF 104 of the third embodiment of FIG. 8 can be omitted by using the B-reflecting mirror 601 having the characteristic shown in FIG. 7 as in the second embodiment of FIG. 6.

The following effects can be provided by the reflecting type color image projecting apparatus of the present invention.

The back focus from the projecting lens to the reflecting type optical writing liquid crystal light valves can be shortened. Moreover, the utilization efficiency of the luminous flux from the light emitting source can more be enhanced than the conventional reflecting type color image projecting apparatus since both of the p polarized light component and the s polarized light component are utilized.

What is claimed is:

1. A reflecting type color image projection apparatus comprising: three reflecting type optical writing liquid crystal light valves;

writing means for writing an image of a color component to each of the three reflecting type optical writing liquid crystal light valves by illuminating a writing light to a writing face of each reflecting type optical writing liquid crystal light valve;

a light emitting source and an illuminating lens for illuminating a light source luminous flux;

a polarized light separating and synthesizing optical system for illuminating polarized light luminous fluxes corresponding to the respective color components on reading faces of the respective reflecting type optical writing liquid crystal light valves, reflectively reading the written images of the respective color components and synthesizing the images of the respective color components;

a projecting lens for magnifying and projecting a read color image; and wherein the polarized light separating and synthesizing optical system comprises a polarized beam splitter for splitting the light source luminous flux into two polarized light illuminating luminous fluxes, a green color separating means for separating only a green component of one of the polarized light illuminating fluxes and a red and blue color separating means for separating the other one of the polarized illuminating luminous fluxes into a red component and a blue component.

2. The reflecting type color image projecting apparatus according to claim 1, wherein the red and blue color separating means comprises a green cut filter for cutting the green color component and a blue or a red reflection mirror.

3. The reflecting type color image projecting apparatus according to claim 1, wherein the red and blue color separating means comprises a blue or a red reflection mirror.

\* \* \* \* \*